April 25, 1967 N. G. MUSKOVAC 3,316,427
PHASE SHIFT GATE DRIVE CIRCUIT
Original Filed Nov. 19, 1963 2 Sheets-Sheet 1

INVENTOR
*Nicholas G. Muskovac*

United States Patent Office 3,316,427
Patented Apr. 25, 1967

3,316,427
PHASE SHIFT GATE DRIVE CIRCUIT
Nicholas G. Muskovac, Williamstown, Mass., assignor to Sprague Electric Company, North Adams, Mass., a corporation of Massachusetts
Original application Nov. 19, 1963, Ser. No. 324,626, now Patent No. 3,304,438, dated Feb. 14, 1967. Divided and this application June 10, 1966, Ser. No. 556,696
5 Claims. (Cl. 307—88.5)

This application is a division of U.S. patent application Ser. No. 324,626 filed Nov. 19, 1963.

This invention relates to phase shift circuits containing a variable resistance and a capacitance so as to be capable of shifting the phase of the output voltage relative to the input voltage while maintaining the output voltage at a substantially constant magnitude. More particularly this invention relates to a phase shift network in which the capacitance is kept constant and the resistance element is a transistor.

A phase shift circuit capable of providing a wide angle phase shift while maintaining a reasonably constant magnitude of output voltage is provided by a network which has a first branch circuit and a second branch circuit energized from an alternating current source. The first branch circuit includes a pair of impedances and a first output terminal, which is established at the juncture of these elements. A second branch circuit includes third and fourth impedance elements which are serially connected. A second output terminal is connected between the third and fourth impedance elements.

The purpose of the phase shift networn is to vary the phase between the output voltage and the input voltage so that one either leads or lags behind the other. One use of such a phase shifting network is to provide a gate firing voltage for a silicon controlled rectifier, hereafter referred to as SCR, which may be varied with respect to the time of application of the SCR anode voltage.

To assist this control of the SCR firing time it is desirable to provide a variable resistance element which can in effect be varied in range from infinity to zero so that the shift of the phase angle can be effected through a full 180°.

Line voltage supplying the power for phase shifting may be subject to a variation in potential. It is desirable to be able to compensate for this change in line voltage. This is particularly important for the period during which the SCR is conducting.

It is also desirable to provide full wave control of a pair of SCR's. Thus the third and fourth impedance elements may be a capacitor and a bridge circuit which includes the variable resistance element. The second output terminal is connected between the capacitance and the bridge circuit. Furthermore, it is desirable to have the variable resistance element controllable by means of a D.C. current signal.

It is an object of this invention to provide a controlled simplified phase shifting network for a pair of SCR's.

It is another object of this invention to provide a phase shift network, for control of a pair of silicon controlled rectifiers, having a resistance element with an effective resistance of from substantially infinity to zero.

It is still another object of this invention to provide a control for silicon controlled rectifiers which compensates for line voltage changes while maintaining a constant current.

These and other objects of this invention will become more apparent upon consideration of the following description taken together with the drawing in which.

In general, this invention provides an R.C. phase shifting network in which a bridge circuit is serially connected to a capacitor. A transistor connected across the bridge circuit provides a variable resistance, and the capacitance is kept constant. The output from this phase shifting network is connected to the gates of a pair of silicon controlled rectifiers so that the phase shifting network may vary the time of the application of alternate firing signals to the silicon controlled rectifiers.

Figure 1:
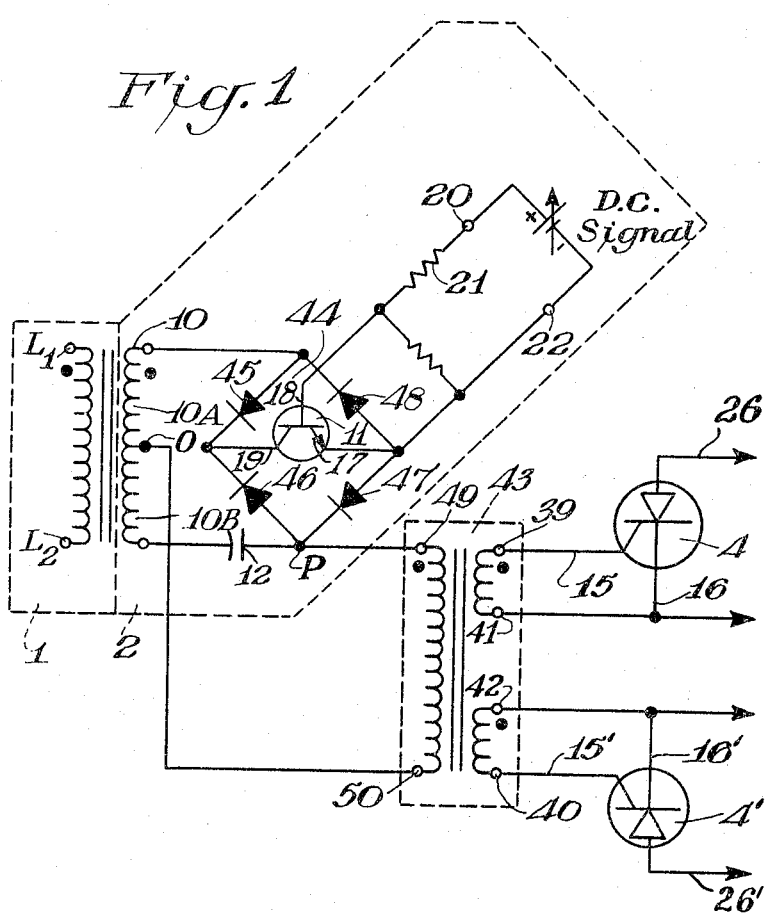
FIGURE 1 is a schematic diagram of a silicon controlled rectifier firing circuit according to this invention.

FIGURE 1 illustrates one form of the invention, comprising transformer and power supply unit 1, phase shifting network 2, coupling transformer 43, and SCR4 and 4'. The latter are supplied from A.C. input terminals L1 and L2 and have a load connected in series with their anodes.

The phase shifting network is supplied with A.C. from a center tapped secondary winding 10 of transformer 1.

The variable element is a transistor 11 which is connected across a bridge 44. The bridge is serially connected with a fixed capacitor 12 and a juncture which is also common with an output terminal P between the bridge 44 and capacitor 12. The other output terminal O is the center tap of the secondary winding 10. The two parts of the secondary winding on each side of the output terminal O provide the first and second impedances 10A and 10B in the phase shifting network 2.

Figure 2:
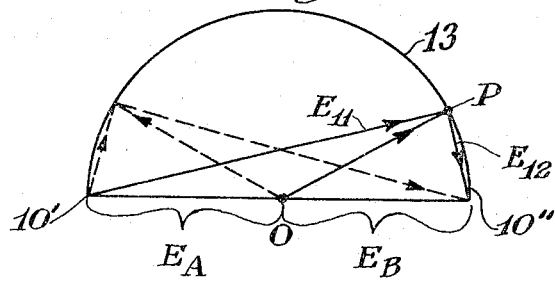
FIGURE 2 is a voltage vector diagram depicting voltage vectors obtained in the phase shifting network of FIGURE 1.

The voltage vector diagram shown in FIGURE 2 depicts the voltage vectors obtainable from the phase shifting network 2 wherein the vector 10'–10'' represents the fixed base line vector as established by the alternating current source 1. The impedance elements 10A and 10B are represented by the vectors $E_A$ and $E_B$. The juncture of the elements 10A and 10B establishes the potential at the output terminal O, which is midway between the ends of the vector 10'–10''. The transistor 11 and fixed capacitor 12 respectively are represented by voltage vector $E_{11}$ and $E_{12}$. The terminal P is represented by an arcuate locus 13.

The phase shifting network is made up of a first and second impedance 10A and 10B in a first branch circuit, and a bridge 44, which includes transistor 11, and capacitor 12 in a second branch circuit. Output terminals O and P are provided along with respective leads. The phase shifting network is energized from the alternating current source of supply unit 1. The transistor is variable, that is, it is relatively variable in impedance. When the resistance of the transistor is varied and the capacitor 12 is kept constant, the point P on the voltage vector diagram of FIGURE 2 will describe an arcuate locus 13 having the base line 10'–10'' as a chord of this arc. The chord is in fact the diameter of the semicircle locus 13.

In FIGURE 1, the variable element is the transistor 11. The transistor 11 has an emitter 17, a base 18 and a collector 19. The emitter 17 is connected to one side of bridge 44, and the collector 19 is connected to the other side. The capacitor 12 is connected to the inductance 10B at the opposite end of the secondary winding 10. The center tap of the secondary winding 10 is between the inductance 10A and the inductance 10B. This center tap is output terminal O.

A transistor P-N junction such as the base 18 to collector 19 relation of transistor 11 acts to pass current from the P-layer to the N-layer only and has a high resistance path from the N-layer to the P-layer. The transistor can be made to vary its conductance by applying a direct current signal to its base 18, and the resistance of the transistor is accordingly varied. Reducing the resistance of the transistor advances the phase angle of the A.C. output voltage between terminals O and P of the phase shifting network 2. The reference voltage is established across the first branch circuit of inductance 10A and 10B. The other branch circuit is established across the transistor and the phase capacitor, connected across the fixed branch circuit. The output voltage is variable in phase but not materially in magnitude, with the variable resistance of the transistor 11.

A direct signal is supplied to the base 18 from a D.C. signal terminal 20 through a current limiting resistor 21. The means for supply of a variable D.C. signal is connected to the terminal 20 and a terminal 22 connected across the base 18 and emitter 17 of transistor 11.

Thus a signal triggered by the D.C. signal supply through terminals 20, 22 to the base 18 reduces the resistance of the transistor 11 and thus advances the phase angle of the A.C. output voltage between terminals O and P. The transistor provides a phase shift of about 170° to 175°. This moves the point P around the arcuate locus based on the chord 10'–10''.

A circuit construction in accordance with FIGURE 1 exhibits alternate pulses having a start at a phase angle with the A.C. input voltage which can vary from an almost 180° lag to an angle substantially equal to that of the input voltage by passing a few microamperes of D.C. current through the transistor 11.

The SCR control is provided at a pair of gate terminals 39 and 40 and cathode terminals 40 and 42. The control pulse from the phase shifting means 2 is provided from the transformer 43 applying pulses on the respective gate terminals 39 and 40 alternately.

The output from the phase shift network is thus alternately connected to the respective gates of the SCR's 4 and 4' so that the output of the phase shift network may vary the time of application of the firing signal to the SCR's alternately.

The alternating output of the phase shifting network which is applied to the transformer 43 is the product of the phase shifting network 2 of FIGURE 1 which is comprised of an NPN transistor 11 together with a bridge 44 made up of diodes 45, 46, 47 and 48. The transistor 11 and the bridge 44 are able to pass an alternating current.

As indicated, the phase shifting network has two branches and one branch has a leg provided by the transistor 11 and the bridge 44. This is the variable leg. The other leg of this branch of the phase shifting network is provided by the capacitor 12 which is serially connected with the bridge. The output P is at a juncture common between the capacitor 12 and the bridge 44. The other output terminal O is at the center tap of the secondary winding 10. The two legs of the other branch of the phase shifting network are sections 10A and 10B of the secondary winding.

The phase shifting network output terminal P is connected to terminal 49 of the primary of transformer 43. The phase shifting network output terminal O is connected to the terminal 50 of the transformer primary. The secondary windings of transformer 43 are phased 180° apart and provide gate pulses alternately to the respective gate terminals 39 and 40. Thus, through the transformer 43 the output of the phase shifting network provides alterntae pulses to the two SCR's 4 and 4' in a full wave control.

The two outputs which are phased 180° apart can be amplified by the addition of transistors in the means illustrated by the embodiment of FIGURE 5 of U.S. patent application Ser. No. 324,626, filed Nov. 19, 1963. A high current output is then provided which is particularly suitable for firing large SCR's.

Figure 3:
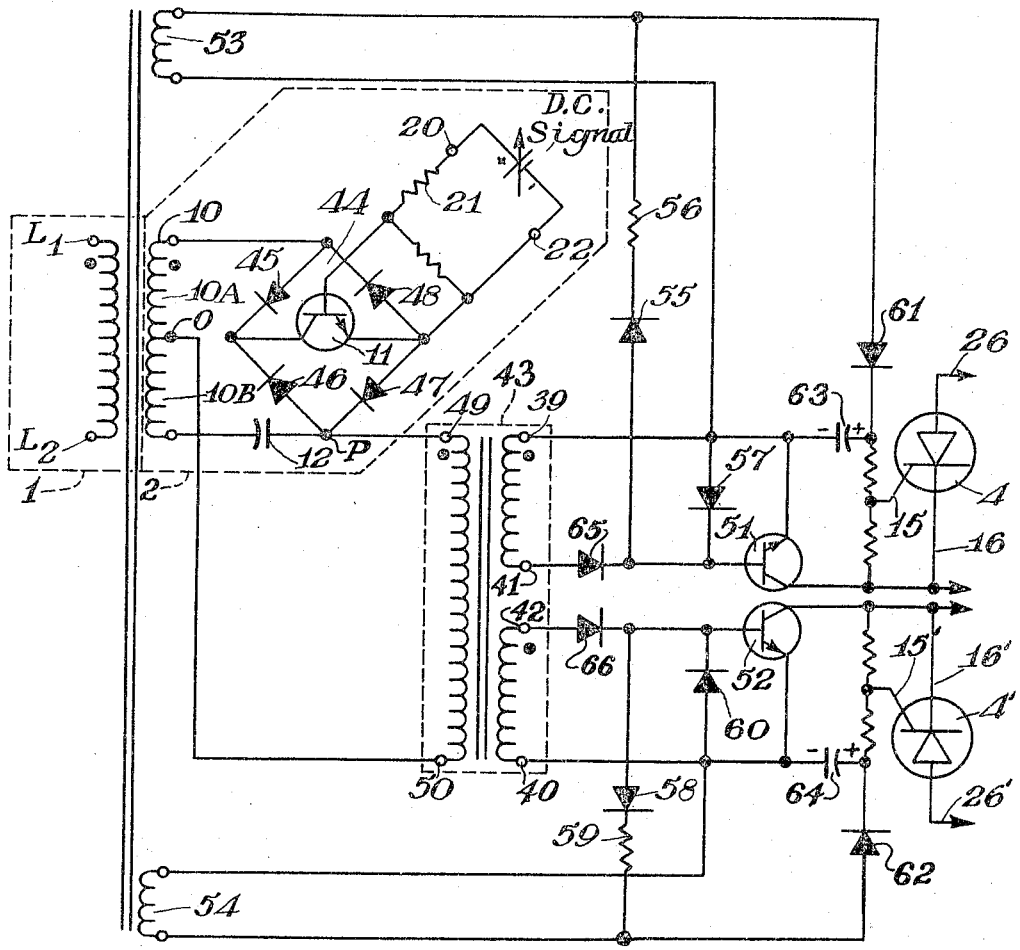
FIGURE 3 is a schematic diagram of another embodiment of the control circuit of this invention.

FIGURE 3 illustrates a circuit with a further modification based upon the full wave control system shown in FIGURE 1. In FIGURE 3 a pair of current limiting resistors 56 and 59 and blocking diodes 55 and 58 provide a potential from a secondary winding on the power supply transformer which controls the transistor current of a pair of transistors through which the control pulse is applied to the SCR's 4 and 4'.

In FIGURE 3 the firing of first one and then the other of the two SCR's 4 and 4' which are connected in inverse parallel in the A.C. line is controlled by a transistor 51 for SCR4 and a transistor 52 for SCR4'. Transistors 51 and 52 operate in the alternate phases of the A.C. power. The emitter of each of the transistors 51 and 52 is connected to the respective gates 15, 15'. Similarly, the respective collectors of the transistors 51 and 52 are connected to the respective cathodes 16 and 16'. This embodiment provides an amplified output of the basic R.C. phase shifting network and produces a high current square wave pulse particularly suitable for firing large SCR's.

A pair of secondaries 53 and 54 of power supply unit 1 are connected between the emitter and base of the respective transistors 51 and 52. Rectified and filtered D.C. voltage is provided to transistors 51 and 52 from secondaries 53 and 54, through diodes 61 and 62 and fixed capacitors 63 and 64. In addition, diodes 65 and 66 are serially connected between the secondaries of coupling transformer 43 and the bases of transistors 51 and 52 respectively. These diodes block negative portions of the phase shifter output waveform respectively, or in other terms pass only those portions of the phase shift output whose polarity is the same as the conductive half-cycle of SCR anode voltage, respectively.

The emitter of 51 is connected to the base of 51 through a diode 55 and a current limiting resistor 56 and a diode 57. Similarly, the emitter of transistor 52 is connected to the base of transistor 52 through a diode 58, a current limiting resistor 59 and diode 60. Accordingly, the base of each transistor 51 and 52 is driven positive during alternate half cycles while the diodes 55, 57, 58 and 60 prevent the base from being driven positive during negative half cycles of anode voltage 26 and 26'. The diodes 55 and 57 and the resistor 56 comprise a clamping network for cutting off transistor 51 when the anode 26 is negative. Similarly, the diodes 58 and 60 and the current limiting resistor 59 comprise a clamping network which cuts off transistor 52 whenever, the anode 26' is negative.

The phase shifting network of this invention provides a varying resistance element which provides a constant current in the case of changes in the supply line voltage. Any voltage changes in the input line voltage produce an increase in resistance so that the current remains the same. At the same time the phase of the output voltage is caused to lag behind the phase of the input voltage, or stated otherwise, the increased input voltage retards the phase angle of the output voltage. The new circuit provides an effective resistance over a very wide range of frequencies. This makes the resultant device particularly flexible or adaptable. A range of the phase shifting circuit has produced effective phase shifting results through a frequency ratio ranging from 1 to 20.

Another advantage of the present invenion is found in the automatic disabling of the system if the D.C. control signal is lost. A further advantage is the speed of the response to the control in microseconds as compared to milliseconds in previous devices. Therefore, this system responds much faster. In addition, a few hundred microwatts of the D.C. signal can control the SCR from 98% of full power capacity down to zero.

The embodiment of FIGURE 3 provides a system which will fire large SCR's and control their conduction angle over a wide range. A gate current requirement of 150 milliamps or greater can be met by this arrangement. As mentioned above, the produced pulse may have a wide rectangular or square-wave nature.

It will be understood that the described embodiments illustrate the adaptability of this invention and various modifications are possible. For example, a P-N-P transistor may be employed as the variable resistance (the base lead must be made negative with respect to the emmitter lead in order for the transistor to conductor), or employed as the pulse shaping and amplifying transistors of FIGURE 3. Similarly, a germanium or a silicon transistor may be used in all cases. Furthermore, the SCR pair could be provided as a single unit, rather than discrete components as shown.

The circuits described in the foregoing embody principles which are new in the construction of control systems. Those principles make possible a simplified phase shifting network. The features of this invention which are believed to be new are set forth in the accompanying claims.

What is claimed is:

1. An electrical apparatus including in combination a phase shifting means for producing an output voltage variable in phase relationship to an applied alternating voltage and connectible to a pair of controlled rectifiers for applying firing signals thereto; said phase shifting means including a first and second branch circuit in parallel connection; said first branch circuit including a pair of impedances having a first output terminal therebetween, said second branch circuit including a capacitor and a bridge of rectification have a second output terminal therebetween, said bridge having two parallel branches and a transistor connected therebetween; signal means connected to said transistor to vary the relative conductance thereof and deliver an alternating output of said phase shifting means variable in phase relationship to the applied voltage; amplifying means; and means coupling said first and second output terminals to said amplifying means; said amplifying means being connectible to said pair of controlled rectifiers for applying amplified firing signals in the alternate positive waves of alternating current whereby the time of application of the respective firing signals may be varied with respect to initial application of the respective positive half-cycles of said alternating voltage.

2. An electrical apparatus as claimed in claim 1 in which said coupling means includes a transformer having a primary winding and a pair of secondary windings, said primary being connected across said first and second output terminals, and said secondary windings being coupled to said amplifying means.

3. An electrical apparatus as claimed in claim 2 in which said coupling of each secondary winding includes unidirectional current means for blocking negative firing signals from said phase shifting means.

4. An electrical apparatus as claimed in claim 1 in which said amplifying means is a pair of transistors each having their respective base and emitter coupled to said first and second output terminals and their respective emitter and collector connectible to one of said controlled rectifiers, and unidirectional current means coupling said source to said emitter and collector of respective transistors to provide rectified voltage thereto.

5. An electrical apparatus as claimed in claim 4 including means for producing a negative transistor base-to-emitter bias producing a cut-off condition during the negative half of the rectifier anode voltage on the respective controlled rectifiers.

References Cited by the Examiner
UNITED STATES PATENTS
3,142,781   7/1964   Izenour _____ 315—194

ARTHUR GAUSS, *Primary Examiner.*

S. D. MILLER, *Assistant Examiner.*